United States Patent [19]
Milo

[11] Patent Number: 5,815,337
[45] Date of Patent: Sep. 29, 1998

[54] TAPE DRIVE HAVING AN ARCUATE SCANNER AND A METHOD FOR CALIBRATING THE ARCUATE SCANNER

[75] Inventor: Richard K. Milo, Lake Forest, Calif.

[73] Assignee: Seagate Technology, Inc., Scotts Valley, Calif.

[21] Appl. No.: 547,270

[22] Filed: Oct. 24, 1995

[51] Int. Cl.$^6$ .................................................. G11B 21/10
[52] U.S. Cl. ............................................ 360/75; 360/72.1
[58] Field of Search ................................ 360/81, 83, 84, 360/77.02, 73.03

[56] References Cited

U.S. PATENT DOCUMENTS

| | | |
|---|---|---|
| 2,750,449 | 6/1956 | Thompson et al. .................... 360/84 X |
| 2,772,328 | 11/1956 | Lyon ........................................ 360/84 |
| 2,924,668 | 2/1960 | Hoshino et al. . |
| 3,320,371 | 5/1967 | Bach . |
| 3,351,718 | 11/1967 | Banning et al. ............................ 360/83 |
| 3,790,755 | 2/1974 | Silverman ............................. 360/84 X |
| 4,112,472 | 9/1978 | Hauke et al. .......................... 360/84 X |
| 4,139,871 | 2/1979 | Yoshida et al. ........................ 360/84 X |
| 4,636,886 | 1/1987 | Schwarz . |
| 4,647,993 | 3/1987 | Schwarz et al. . |
| 4,731,681 | 3/1988 | Ogata . |
| 5,060,104 | 10/1991 | Kitaori et al. ....................... 360/130.24 |
| 5,339,207 | 8/1994 | Moon et al. . |
| 5,371,638 | 12/1994 | Saliba . |
| 5,396,376 | 3/1995 | Chambors et al. ........................ 360/48 |
| 5,448,430 | 9/1995 | Bailey et al. . |
| 5,453,887 | 9/1995 | Negishi et al. . |
| 5,488,525 | 1/1996 | Adams et al. ........................ 360/77.12 |

FOREIGN PATENT DOCUMENTS

| | | | |
|---|---|---|---|
| 63913 | 4/1986 | Japan ........................................ 360/83 |
| 169716 | 7/1989 | Japan ........................................ 360/75 |
| WO 5/06940 | 3/1995 | WIPO . |
| WO 6/00437 | 1/1996 | WIPO . |

OTHER PUBLICATIONS

R.W. Lissner, Movable Head/Movable Track Accessing Arrangement IBM, Tech Disclosure Bulletin Mar. 1977.

Primary Examiner—Aristotelis M. Psitos
Assistant Examiner—K. Wong
Attorney, Agent, or Firm—McDermott, Will & Emery

[57] ABSTRACT

A tape drive with an arcuate scanner and a method for calibrating the arcuate scanner double wraps recording tape on the scanner to create two scanner/tape contact zones. The two crossings of a scannable line on the recording tape by a scanner head permit the transit times of the scanner head above the scannable line and below the scannable line to be measured. A comparison of the transit times provides an indication as to whether the center of rotation of the scanner is correctly pointing at the recording tape centerline, and corrective action is taken if there is a pointing error. Once the scanner is correctly pointed, an accurate calibration of the scanner, including the commutation and timing between read and write operations, is performed by measuring the transit time of a scanner head from a stationary point to a defined location on the tape.

21 Claims, 6 Drawing Sheets

Figure 9b

TAPE DRIVE HAVING AN ARCUATE SCANNER AND A METHOD FOR CALIBRATING THE ARCUATE SCANNER

FIELD OF THE INVENTION

The present invention relates to tape drives having an arcuate scanner, and more particularly to the calibration of the scanner heads of the arcuate scanner to accurately commutate between and time the read/write operations of the arcuate scanner.

DESCRIPTION OF RELATED ART

Conventional magnetic tape drive systems provide a reel-to-reel transport of magnetic tape past a fixed recording/reading location where a stationary single- or multiple-track head is positioned. In the past, recording and playback was performed longitudinally with respect to the tape by moving the tape on its longitudinal axis past a record/playback location where a stationary head mechanism is located. In the stationary head tape drive, a plurality of transversely-aligned heads are fixedly positioned with respect to the tape during recording and playback. Information is placed on the tape in the form of a plurality of parallel longitudinally-extending tracks.

Another known type of scanning technology, however, is arcuate scan technology. In arcuate scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

Figure 9A:
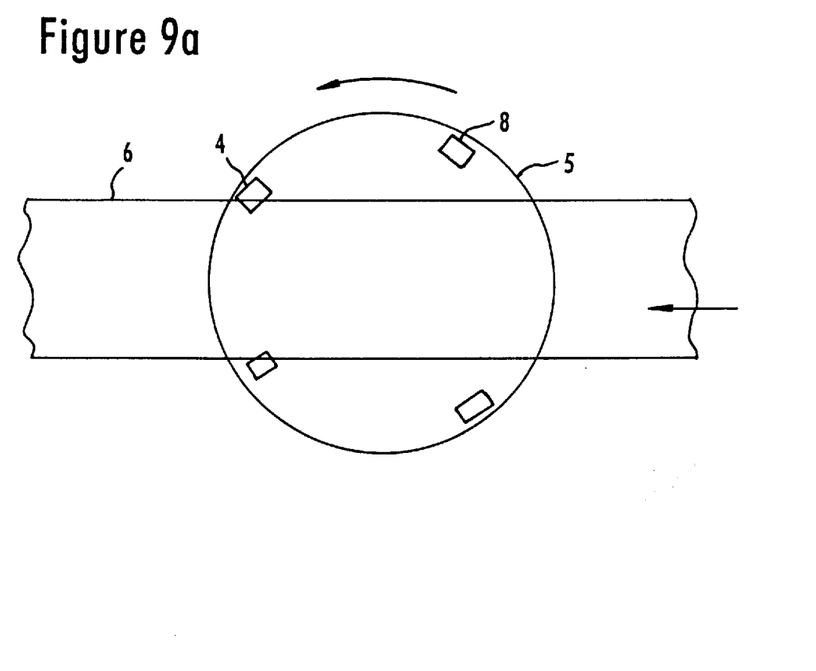
FIG. 9a is a schematic end view of a prior art arcuate scanner, with a write head approaching the recording tape.
Figure 9B:
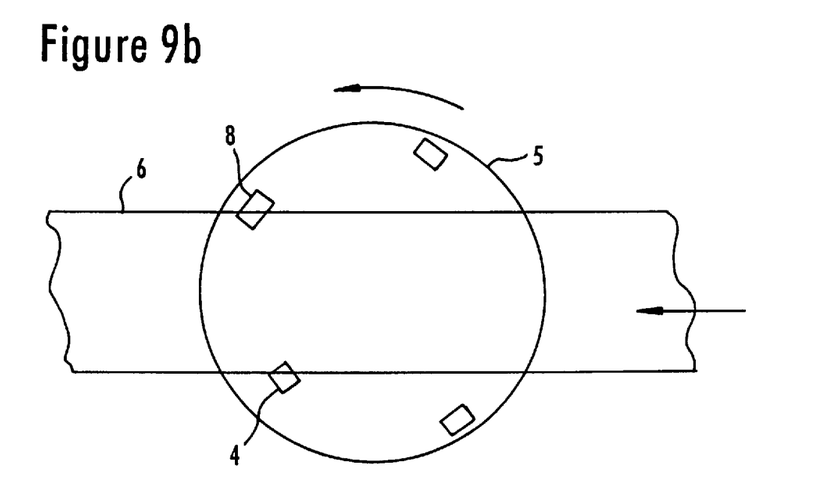
FIG. 9b is a schematic end view of a prior art arcuate scanner, with a read head approaching the recording tape.

An example of an arcuate scanning tape drive, which seeks to overcome some of the servoing problems of the above-listed arcuate scanning tape drives, is described in International Application WO 93/26005, which is herein expressly incorporated by reference. In this arcuate scanning tape drive, a number of scanner heads are provided around the periphery of the circular planar surface. As seen in FIG. 9a, a write scanner head 4 of a scanner 5 is positioned over a recording tape 6. As the scanner 5 rotates and the tape 6 moves as indicated by the arrows, the write scanner head 4 completes its pass over the tape 6 and a read head 8 is positioned to begin reading information on the tape 6 (FIG. 9b). The operation of the scanner 5 must therefore be commutated (switched) from "write" to "read". The timing of the commutation is critical so that the heads 4, 8 are properly positioned over the tape 6 when performing their write and read operations. In order to properly commutate between the read/write operations of the scanner, and time these read/write operations, it is necessary to accurately determine the rotational position of the various scanner heads relative to a stationary (non-rotating) point. This stationary point (i.e. "rotational point") may be a scanner tachometer or tachometer index that the scanner heads pass as the scanner rotates. The position of the various heads relative to the scanner tachometer or tachometer index is used to time the various heads.

In order to write (record) on a tape with an arcuate scanner, it is necessary to know where the scanner is pointed so as to know when and where to turn on and off a head for writing so that information will be correctly written on the tape. On playing back the tape, on the recorder that originally recorded the information or by any other recorder, the scanner needs to be pointed at virtually the same place on the tape where the first (recording) scanner was pointed. Otherwise, the recording and playback arcs will not match. In other words, in arcuate scanning, it is necessary to stay on track for recording, and on replay, it is necessary to match the pointing of the reading scanner with the pointing of the scanner that wrote the information on the tape.

SUMMARY OF THE INVENTION

This and other needs are met by the present invention which provides a method of calibrating scanner head positions of an arcuate scanner having a plurality of scanner heads. This method includes the steps of double wrapping a scanner with a recording tape to create two contact zones between the scanner and the recording tape. The recording tape has at least a first readable calibrating stripe extending along its length. The calibrating stripe divides the recording tape into at least a first part above the calibrating stripe and a second part below the calibrating stripe. A first transit time is measured for a scanner head to travel through the first part above the calibrating stripe. A second transit time is measured for the scanner head to travel through the second part below the calibrating stripe. The first and second transit times are compared and an amount of pointing error of the scanner at the tape is determined as a function of this comparison. Any mispointing of the scanner with respect to the recording tape is corrected to reduce the pointing error to substantially zero. Once the pointing error is substantially zero, a third transit time for the scanner head is measured from a defined rotational point to the calibrating stripe to thereby calibrate the head positions of the plurality of scanner heads.

The employment of a calibrating stripe permits the measurement of transit times of a scanner head in the different parts of the tape defined by the calibrating stripe. Once these transit times are measured, they may be compared with each other to provide an indication as to the accuracy in the pointing of the scanner at the recording tape. Once the scanner accurately points at the tape, the transit time for a scanner head from a tachometer index to a specific location on the tape may be accurately measured and corrected if necessary.

Another aspect of the present invention provides a tape drive for storing information on a recording tape having a longitudinally extending scannable line. The tape drive comprises an arcuate scanner having a plurality of scanner heads, this arcuate scanner performing read and write operations on the recording tape. The tape drive also has a pointing position controller that adjusts the scanner to control pointing of the scanner at the recording tape as a function of the measured transit times of one of the scanner heads on the different sides of the scannable line. A control arrangement controls the timing of and commutation between the read and write operations as a function of the transit time of the scanner head from a predetermined rotational point to the scannable line, when an error in the pointing of the scanner is substantially zero.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figures 1, 2:
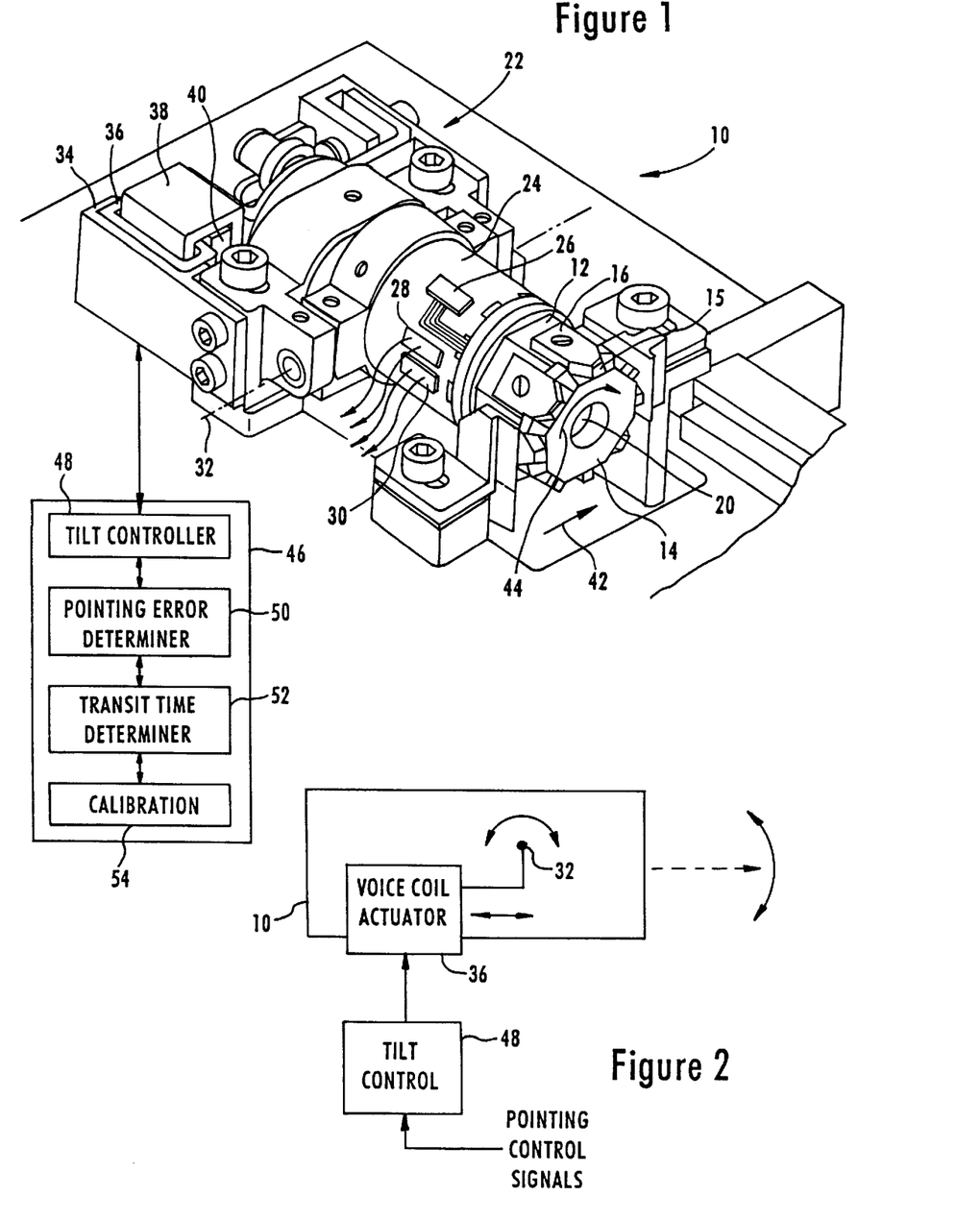
FIG. 1 is a diagram of an arcuate scanner of a tape drive constructed in accordance with an embodiment of the present invention.
FIG. 2 is a schematic representation of a tilt controller mechanism for the arcuate scanner of FIG. 1.

FIG. 1 depicts a perspective view of an arcuate scanner head assembly 10 which writes and reads a sequence of arcuate tracks on a recording tape (not shown). The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece and a stator piece (not shown). The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator. The housing 24 is essentially cylindrical and encloses the structure providing rotational power to the shaft 20.

The windings of the stator are connected to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal each time a full rotation of the shaft 20 is made.

The scanner 10 is positioned at a recording location so that the end face 14 of the drum 12 faces a tape on which a sequence of arcuate tracks is to be written. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

The tilting of the scanner 10 with respect to the tape is accomplished through an arrangement which includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 is pivoted about the pivot axis 32 by an amount that depends upon the relative strengths of the voice coil 36 field and the field of the permanent magnet 40, thereby selectively positioning the axis of rotation on which the shaft 20 and drum 12 rotate.

Alternative embodiments of the present invention provide other tilt mechanisms, such as a servo motor, or oppositely directed magnetic coils, as appreciated by one of ordinary skill in the art.

The present invention is not limited to controlling the tilting of the scanner to control the pointing of the scanner at the recording tape. Other embodiments of the invention provide other methods of controlling the pointing position of the scanner. These include controlling the elevation of the scanner with an elevator mechanism, or providing a side swing mechanism for the scanner, as one of ordinary skill in the art will appreciate. For the purposes of providing a description of an exemplary embodiment, however, the pointing position controller will be described in the following as a tilt controller, although the invention also applies to other types of pointing position controllers.

The tape drive of the present invention has a control arrangement 46 which includes a tilt controller 48 that controls the amount of current through the voice coil 36 in response to pointing control signals provided by a pointing error determiner 50. The control arrangement 46 also includes a transit time determiner 52 that measures the transit times of scanner heads around their travel arcs, and also includes a calibration section 54 which calibrates the timing and commutation of the read and write operations as a function of a measured transit time. The control arrangement 46 may be implemented, for example, by a microprocessor. The operation of the control arrangement 46 will be described in more detail later.

Figure 3A:
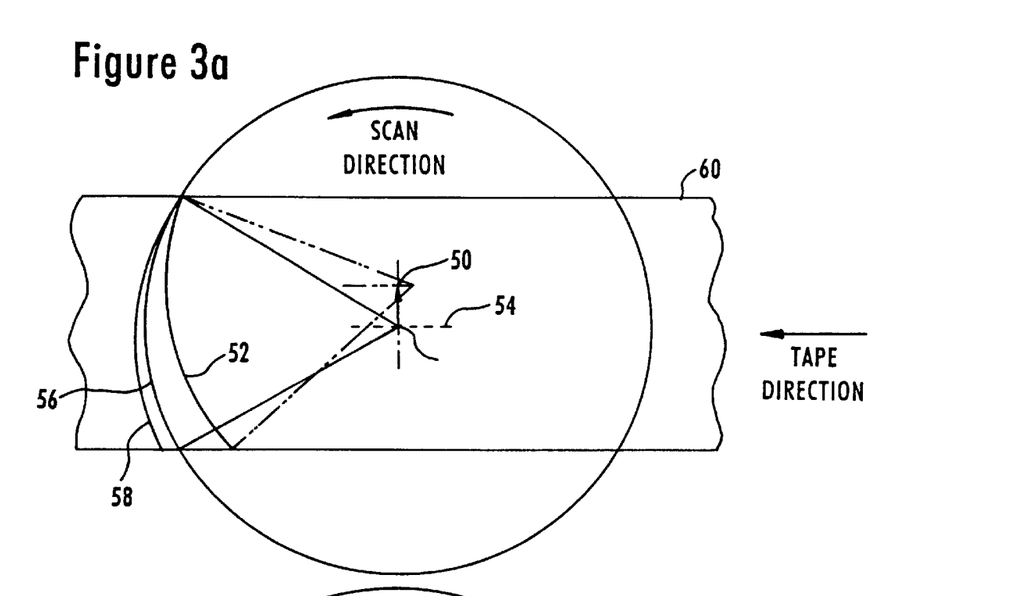
FIGS. 3a and 3b illustrate tilt servoing of the arcuate scanner of FIG. 1 in accordance with an embodiment of the present invention.

FIG. 2 depicts a schematic representation of the scanner 10 and the operation of an embodiment of the tilt controlling arrangement. In response to the pointing control signals, the tilt controller 48 provides a voice coil actuator signal suitable to drive the conventional voice coil actuator 36. The scanner 10 is pivoted about axis 32 to position the center of the scanning rotation with the centerline of a recording tape. FIG. 3a depicts a scanner 10 that has been misaligned with respect to the centerline of a tape 60 to point at location 50. In such a case, the scanner will incorrectly read or write along an arcuate track 52. By contrast, when the center of rotation of this scanner 10 is properly aligned at the centerline 54 of the tape 60, the scanner 10 will correctly read or write along the track 56. The track 56 is an idealized representation, the actual track written by a properly centered scanner 10 falling along line 58 since the movement of the tape 60 tends to drag the end of a track beyond its beginning in the direction of the tape motion.

Figure 3B:
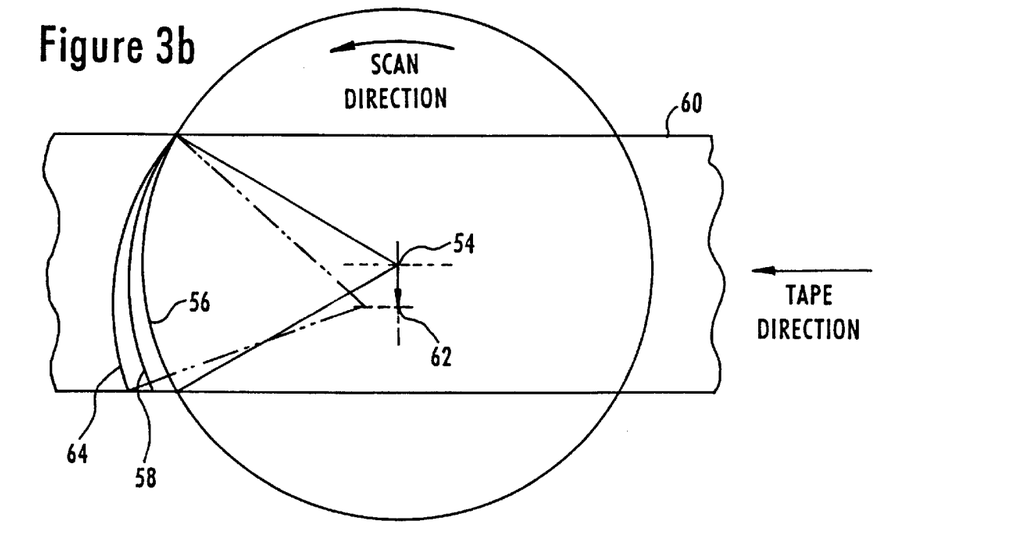

FIG. 3b depicts a situation where the center of rotation of the scanner 10 points below the centerline of the tape 60, to location 62. In this case, the scanner 10 would improperly scan the arc along line 64, rather than the correct arc of line 56. (Again, the actual track followed by the scanner during a read and write is along line 58, due to drag.)

From FIGS. 3a and 3b, it is apparent that accurate reading and writing requires the center of scanner rotation to be properly aligned with the centerline of the tape. The uncorrected tilting of the scanner with respect to the recording tape will cause the data tracks to be misaligned. In addition to the misalignment of the tracks and the resultant difficulty in reading and writing, the misalignment will also cause problems in the timing of the commutation between the writing and reading operations. For example, the path 52 in FIG. 3a is longer than the path 56 that would be followed by a scanner head when the scanner 10 is properly aligned. Assume, for example, that a write scanner head scans across a tape 60 along line 56. The commutation between writing and reading operations will ideally occur when the write scanner head completes the arc 56. However, if the scanner 10 is tilted so that the write scanner head is following track 52, commutation may occur before the write scanner head has completed writing the data track 52.

In order to calibrate the commutation and timing of read and write operations with an arcuate scanner, the position (or timing) of the various heads relative to the scan tachometer or tachometer index is used. In the prior art, the position of one of the read heads relative to a formatted stripe on the tape is servoed. When the transit time for the read head from the index to the crossing of the read head of the formatted stripe is correct, the read and write operations can be correctly commutated and timed, since the remaining head positions relative to the first head is known.

Figure 4A:
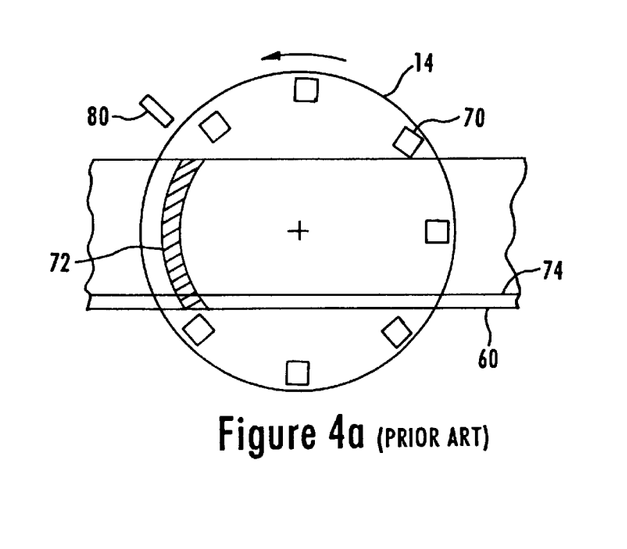
FIG. 4a is a schematic end view of a single wrapped arcuate scanner of a prior art scanner.

FIG. 4a depicts a front face 14 of drum 12 of the scanner 10 and its relationship to the recording tape 60. In this example, the scanner 10 has on its front face 14 eight scanner heads 70 located around its periphery.

Figure 4B:
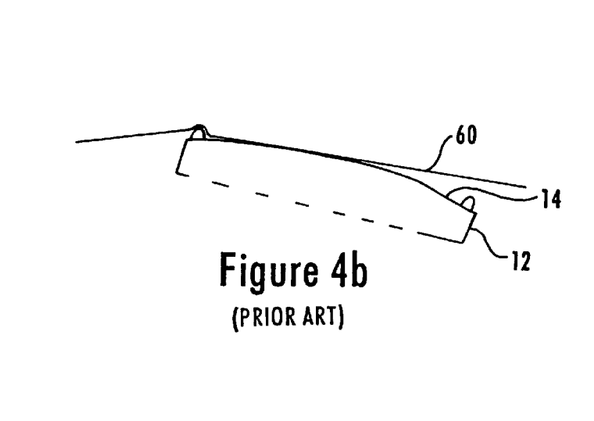
FIG. 4b is a top view of the portion of the scanner and the single wrapping of a recording tape on the scanner according to the prior art.

A conventional arcuate scanner, shown in FIG. 4b, is a single wrapped scanner that makes media contact at only one side of the arcuate scanner. This creates one contact zone 72 between the tape 60 and the end face 14 of the scanner 10. Calibration is performed by measuring the transit time between the tachometer index 80 and a crossing of a scanner head 70 of the LSI 74 (a formatted position stripe on the tape 60). However, if the center axis of rotation of the scanner is not accurately aligned with the centerline of the tape 60, the servoing of the scanner rotation and correct calibration of the timing of the read and write operations may not be possible.

Figure 5A:
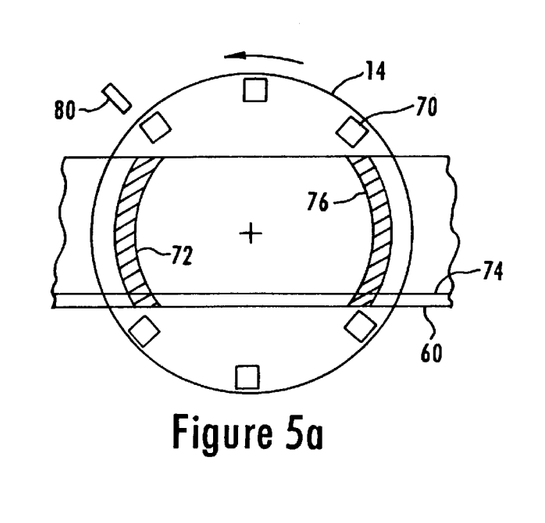
FIG. 5a is a schematic end view of a double wrapped arcuate scanner of the present invention.
Figure 5B:
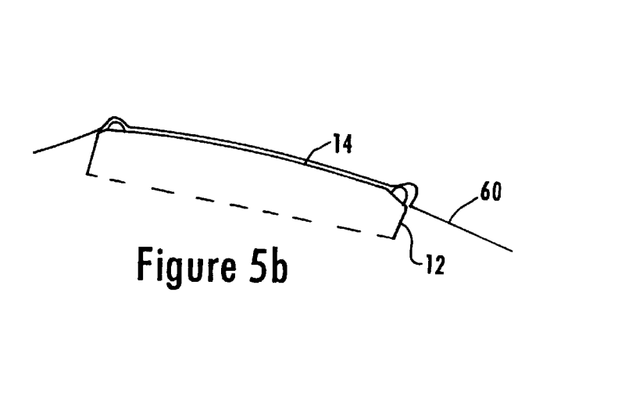
FIG. 5b is a top view of the portion of the scanner and the double wrapping of a recording tape on the scanner according to the present invention.

The present invention provides a method and arrangement for accurately aligning the center of rotation of the scanner 10 with the centerline of the tape 60 prior to calibration of the commutation of the scanner heads and the timing of the read and write operations. Once the scanner 10 is properly aligned, the transit time of the scanner head from the tachometer index 80 to the LSI stripe 74 on the tape 60 may be accurately determined. Since the remaining head positions are known relative to the measured scanning head, the read and write operations can be correctly commutated and timed. In order to accurately align the center of rotation of the scanner 10 with the centerline of the tape 60, the present invention provides a double wrapping of the tape 60 on the end face 14 of the scanner 10. This is depicted in FIGS. 5a and 5b. Two contact zones 72, 76 are thereby created by the double wrapping of the tape 60 on the scanner end face 14.

The two contact zones 72, 76 created by the present invention allow a scanner head to read a scannable longitudinal stripe, such as LSI stripe 74 or a centerline stripe (not shown in FIG. 5a) at two different points along its arc of travel. This allows the transit time of the scanner head above the reference line to be compared with the transit time of the scanner head below the reference line created by the scannable stripe.

Figure 6:
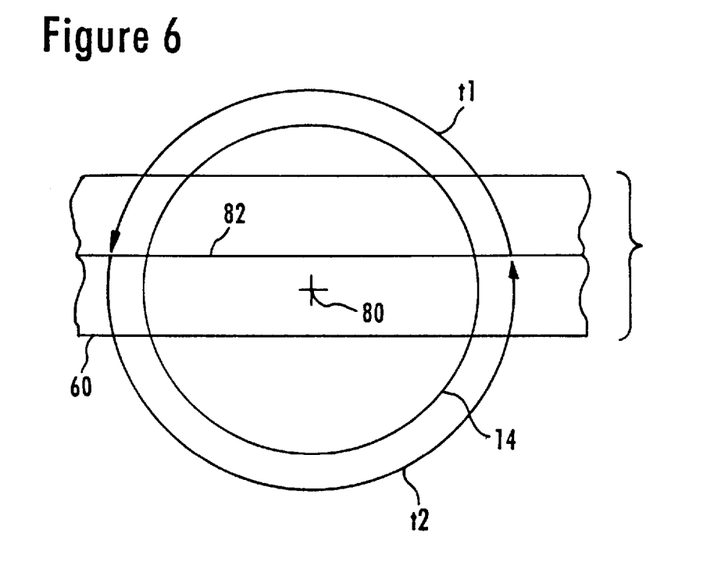
FIG. 6 is a schematic end view of the scanner of the present invention and a recording tape, with scanner head transit times indicated as arcs, the scanner being incorrectly pointed at the recording tape.

FIG. 6 depicts an example of a scanner having an end face 14 that is incorrectly pointed at the tape 60. The center of rotation of the scanner 10 is indicated by reference numeral 80. The centerline of the tape 60, which is a scannable line (i.e. may be read by one of the scanner heads 70) is indicated by reference numeral 82. In the example of FIG. 6, the center of rotation of the scanner 10 is below the centerline stripe 82. However, the amount of this "pointing error" (the deviation from the pointing of the center of rotation of the scanner to the centerline stripe 82) may be determined and corrected according to the present invention. In the example of FIG. 6, the transit time t1 for the scanner head to traverse the arc above the centerline stripe 82 of the tape 60 is measured, as well as a transit time t2 for the scanner head to traverse the arc below the centerline stripe 82. The two transmit times can be measured since the double wrapping of the tape 60 on the end face 14 of the scanner allows the two crossings of the centerline stripe 82 to be accurately determined.

Since the center of rotation 80 of the scanner 10 is below the centerline stripe 82 of the recording tape 60 in FIG. 6, the transit time t1 will be shorter than the transit time t2. The transit time determiner 52 of the control arrangement 46 (see FIG. 1) provides these transit times to the pointing error determiner 50. The first and second transit times t1, t2 are compared by the pointing error determiner 50 which produces the pointing control signals for the tilt controller 48 as a function of the comparison of the first and second transit times t1, t2.

In response to the pointing control signals, the tilt controller 48 tilts the scanner 10 until the center of rotation 80 of the scanner 10 is precisely aligned with the centerline stripe 82 of the recording tape 60. In other words, the tilting of the scanner 10 with respect to the recording tape is corrected to reduce the pointing error to substantially zero. The pointing error is substantially zero when the first transit time t1 of the scanner head (above the centerline stripe 82) is equal to the second transit time t2 of the same scanner head below the centerline stripe 82, as shown in FIG. 7.

Once the center of rotation 80 of the scanner 10 is pointing directly at the centerline stripe 82 of the tape 60, the index to crossing of either the centerline stripe 82 or the LSI stripe (not shown) may be accurately determined, as well as all other index to head crossings. This allows the calibration of all of the head commutation positions (timing) by the calibration unit 54 of the control arrangement 46.

In certain preferred embodiments of the present invention, the LSI stripe 74 is a constant position below the centerline stripe 82 of the recording tape 60. Therefore, the correct index to head position (timings) can be generated by adding the constant (a position/timing offset) to the position/timing values that are measured between the index to the head crossing of the centerline stripe 82.

Figure 7:
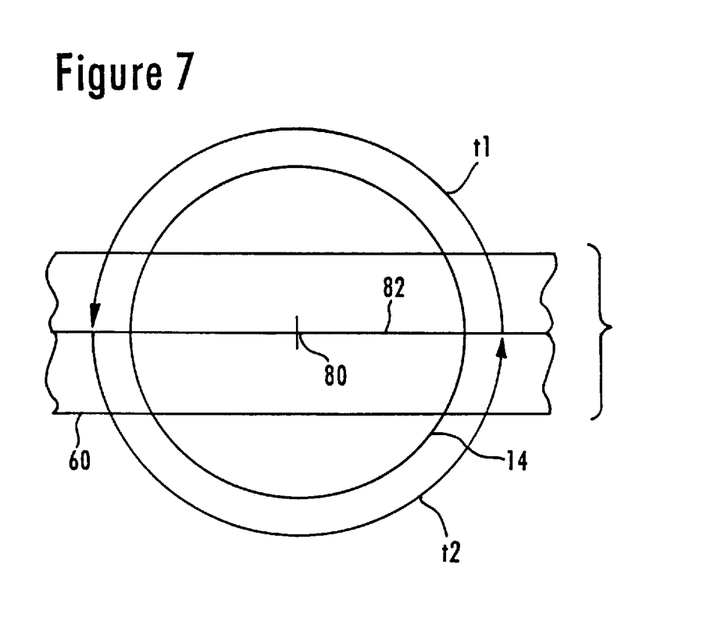
FIG. 7 is a schematic end view of the scanner of the present invention and a recording tape, with scanner head transit times indicated as arcs, the scanner being correctly pointed at the recording tape.

An advantage of the embodiment of FIGS. 6 and 7, in which a centerline stripe 82 is used, is the extreme leverage developed between the first and second transit times t1 and t2 when there is a pointing error. Additionally, all heads, regardless of gap azimuth, read a centerline stripe 82 equally well. Furthermore, the head timing derived is valid regardless of whether the centerline stripe is actually located at the true format centerline of the recording tape 60.

Figure 8:
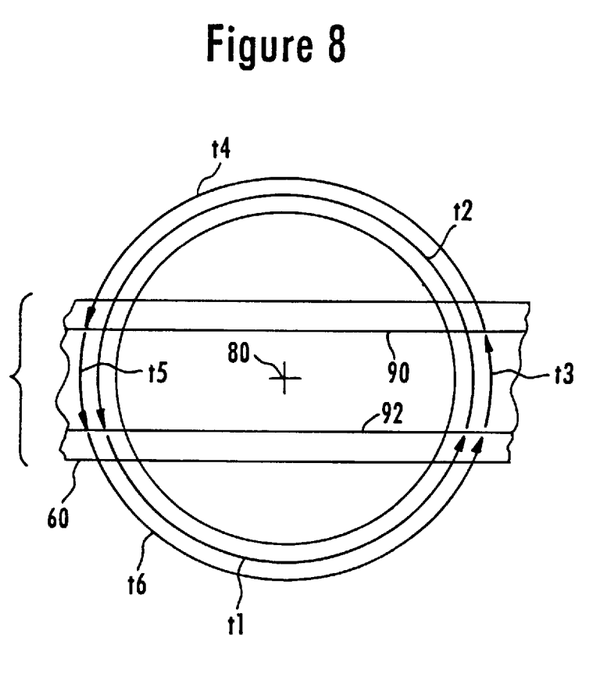
FIG. 8 is a schematic end view of the scanner of the present invention and a recording tape with two calibrating lines, with scanner head transit times indicated as arcs.

FIG. 8 depicts another embodiment of the present invention in which two scannable lines 90, 92 are used in the correcting of the tilting of the scanner 10 with respect to the recording tape 60. The division of the recording tape 60 by two scannable lines 90, 92 allows a larger number of transit times to be measured and used to properly align the rotational axis of the scanner prior to the position/timing calibration. For instance, in the embodiment of FIG. 8, the timings t1 and t2 can be compared, or the timings t3, t4, t5 and t6, or any combination of timings, such as timings t3 and t4 compared to timings t5 and t6. A disadvantage of providing multiple scannable lines 90, 92 when comparing more than two transit times is the loss of leverage provided by two transit times. Also, there is a loss of read output from the scanner heads for stripes located at other than the center of the recording tape 60.

In an embodiment of the method of calibrating the arcuate scanner head positions of the arcuate scanner, the present invention double wraps a scanner with a recording tape to create two contact zones between the scanner and the recording tape. This recording tape has a readable calibrating stripe extending along the length of the recording tape to divide the recording tape into first and second parts, the first part being above the calibrating stripe and the second part below the calibrating stripe. A first transit time is measured for a scanner head in the first part above the calibrating stripe, and a second transit time for the scanner head is measured in the second part below the calibrating stripe. The first and second transit times are compared and an amount of pointing error of the scanner at the tape is determined as a function of this comparison. The pointing of the scanner is then corrected with respect to the recording tape to reduce the pointing error to substantially zero. A third transit time for the scanner head from a defined rotational point (such as a tachometer index) to the calibrating stripe is then measured to thereby calibrate the head positions of the plurality of scanner heads of the scanner.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A method of positioning an arcuate scanner head assembly relative to a recording tape in an arcuate scanner, the arcuate scanner head assembly having a rotatable drum and a plurality of scanner heads on the drum, the method comprising:

rotating the drum and the plurality of scanner heads thereon about an axis of rotation;

causing the recording tape to move past the rotating drum, such that at least two contact zones exist between the drum and the recording tape, the recording tape having at least a fist readable calibrating stripe extending longitudinally along a length of the recording tape to define at least a first zone on one side of the calibrating stripe and a second zone on the other side of the calibrating stripe;

measuring a first transit time for a scanner head rotating through the first zone and a second transit time for the scanner head rotating through the second zone by identifying when the scanner head passes over the calibrating stripe;

comparing the first and second transit times to determine an amount of pointing error of the arcuate scanner head assembly based on a position of the scanner head with respect to the calibrating stripe on the recording tape; and correcting a pointing of the arcuate scanner head assembly with respect to the recording tape to reduce the amount of pointing error to a specified level.

2. The method of claim 1 further comprising:

after correcting the pointing of the arcuate scanner head assembly, measuring a third transit time for the scanner head to rotate from a defined rotational point to the calibrating stripe; and calibrating the arcuate scanner head assembly by activating one or more of the plurality of scanner heads therein based on the third transit time.

3. The method of claim 2, wherein the calibrating stripe is a centerline stripe located at a true centerline of the recording tape.

4. The method of claim 3, wherein the pointing error is substantially zero when the first and second transit times are substantially equal.

5. The method of claim 2, wherein the calibrating stripe is located off a true centerline of the recording tape, and further including adding an offset value to the third transit time to compensate for the location of the calibrating stripe with respect to the true centerline.

6. The method of claim 2, wherein the defined rotational point is a tachometer index.

7. The method of claim 2, wherein the recording tape has at least a second readable calibrating stripe extending along the length of the recording tape, the first and second calibrating stripes dividing the recording tape into at least three parts.

8. The method of claim 7, further comprising measuring a plurality of transit times of the scanner head through each of the at least three parts of the recording tape, and determining the amount of pointing error as a function of two or more of the measured transit times.

9. The method as claimed in claim 2 further comprising controlling a timing of at least one selected scanner head of the plurality of scanner heads during which the selected scanner head is activated to complete at least one selected from a read operation and a write operation with the recording tape.

10. The method as claimed in claim 1 wherein the plurality of scanning heads are capable of performing at least one selected from a read function and a write function.

11. The method as claimed in claim 1 wherein correcting the pointing includes adjusting a position of the arcuate scanner head assembly in response to an output of a pointing position controller.

12. A tape drive for storing information on a recording tape, the recording tape having at least one scannable line extending along a longitudinal direction of the recording tape, the tape drive comprising:

an arcuate scanner head assembly having a rotatable drum with a plurality of scanner heads thereon, the arcuate scanner head assembly being adapted to perform at least one selected from a read operation and a write operation on the recording tape via one or more of the plurality of scanner heads, and wherein at least two contact zones exist between the arcuate scanner head assembly and the recording tape, and the scannable line defines a first zone of the recording tape on one side of the scannable line and a second zone on the other side of the scannable line;

a pointing position controller adapted to adjust a position of the arcuate scanner head assembly relative to the scannable line of the recording tape in response to pointing control signals;

a control arrangement coupled to the arcuate scanner head assembly and the pointing position controller, the control arrangement including:

a transit time determination circuit that determines a first transit time of one of the plurality of scanner heads rotating through the first zone, and a second transit time of the scanner head rotating through the second zone by identifying when the scanner head passes over the scannable line, and a pointing error determination circuit that compares the first and second transit times, determines an amount of pointing error of the arcuate scanner head assembly with respect to the scannable line of the recording tape as a function of the comparison, and generates the pointing control signals to cause the pointing position control mechanism to adjust the arcuate scanner head assembly to reduce the pointing error to a specified level.

13. A tape drive as in claim 12 further comprising a calibration circuit that measures a third transit time of the scanner head to rotating from a defined rotational point to the scannable line, and calibrates the arcuate scanner head assembly by activating one or more of the plurality of scanner heads to perform at least one selected from the read operation and the write operation based on the third transit time.

14. A tape drive for storing information on a recording tape having at least one longitudinally extending scannable line, comprising:

an arcuate scanner head assembly having a plurality of scanner heads on a rotatable drum, the arcuate scanner head assembly being adapted to perform read and write operations on the recording tape;

a pointing position controller that controls the position and pointing of the arcuate scanner head assembly at the recording tape as a function of a treasured transit time of at least one of the scanner heads on one side of at least one of the scannable lines compared with a measured transit time of the scanner head on the other side of the scannable line, where each transit time is measured with respect to the scannable line; and a control arrangement adapted to control the timing of and commutation between the read and write operations as a function of a transit time of the scanner head from a predetermined rotational point to the scannable line, when an error in the pointing of the scanner is within a specified ranger.

15. The tape drive of claim 14, wherein the scannable line is a centerline stripe located at a true centerline of the recording tape.

16. The tape drive of claim 15, wherein the error in the pointing of the scanner is substantially zero when the first and second transit times are substantially equal.

17. The tape drive of claim 14, wherein there is one scannable line and it is located between a longitudinal edge of said recording tape and a true centerline of the recording tape, and wherein the control arrangement includes logic for adding an offset value to the transit time of the scanner head from the predetermined rotational point to the scannable line to compensate for the distance of the scannable line from the true centerline.

18. The tape drive of claim 14, wherein the defined rotational point is a tachometer index.

19. The tape drive of claim 14, wherein the recording tape has at least a second scannable line extending along the length of the recording tape, the first and second scannable lines dividing the recording tape into at least three parts.

20. The tape drive of claim 19, wherein the pointing position controller measures the transit times of the scanner head through each of the at least three parts of the recording tape, and determines the amount of pointing error as a function of the measured transit times.

21. The tape drive of claim 14, wherein the recording tape is double wrapped on at least a portion of the arcuate scanner head assembly to create two contact zones between the recording tape and the scanner heads.

* * * * *